US008866853B2

(12) United States Patent
Uyama et al.

(10) Patent No.: US 8,866,853 B2
(45) Date of Patent: Oct. 21, 2014

(54) INFORMATION PROCESSING APPARATUS, INFORMATION PROCESSING METHOD AND MEDIUM FOR STORING INFORMATION PROCESSING PROGRAM

(75) Inventors: Masashi Uyama, Kawasaki (JP); Masashi Tanimura, Kawasaki (JP); Katsuhiko Akiyama, Kawasaki (JP)

(73) Assignee: Fujitsu Limited, Kawsaki (JP)

( * ) Notice: Subject to any disclaimer, the term of this patent is extended or adjusted under 35 U.S.C. 154(b) by 248 days.

(21) Appl. No.: 13/333,019

(22) Filed: Dec. 21, 2011

(65) Prior Publication Data

US 2012/0188269 A1    Jul. 26, 2012

(30) Foreign Application Priority Data

Jan. 21, 2011    (JP) .................................. 2011-010755

(51) Int. Cl.
*G09G 5/00* (2006.01)
*G06F 3/041* (2006.01)
(52) U.S. Cl.
CPC ...................................... *G06F 3/041* (2013.01)
USPC ............................ 345/661; 345/660; 345/663
(58) Field of Classification Search
CPC combination set(s) only.
See application file for complete search history.

(56) References Cited

U.S. PATENT DOCUMENTS 5,579,037 A * 11/1996 Tahara et al. .................. 345/173
5,615,384 A    3/1997 Allard et al.
6,694,056 B1    2/2004 Ito et al.
2006/0277571 A1 * 12/2006 Marks et al. .................... 725/37
2012/0105331 A1    5/2012 Nomoto

FOREIGN PATENT DOCUMENTS

| JP | 54-074627 | 6/1979 |
|---|---|---|
| JP | 64-002188 | 1/1989 |
| JP | 7-72970 | 3/1995 |
| JP | 07-219700 | 8/1995 |
| JP | 07-244742 | 9/1995 |
| JP | 2000-105798 | 4/2000 |
| JP | 2001-184458 | 7/2001 |
| JP | 2003-242446 | 8/2003 |
| JP | 2009-037556 | 2/2009 |
| JP | 2009-116583 | 5/2009 |
| JP | 2010-092219 | 4/2010 |
| JP | 2012-94008 | 5/2012 |

* cited by examiner

*Primary Examiner* — Kee M Tung
*Assistant Examiner* — Leon T Cain, II
(74) *Attorney, Agent, or Firm* — Staas & Halsey LLP (57) ABSTRACT

An apparatus includes a processor that executes a process including detecting a position of an object with respect to a screen of a display, determining whether a distance from the object to the screen is between a first value and a second value smaller than the first value on a basis of the position, displaying a first image on the screen when the distance is determined to be between the first value and the second value, the first image being an enlarged image of an area corresponding to the position, determining whether the distance is equal to or less than the second value on a basis of the position and displaying a second image when the distance is determined to be equal to or less than the second value, the second image being displayed on the screen when the distance decreases to be the second value.

9 Claims, 8 Drawing Sheets

INFORMATION PROCESSING APPARATUS, INFORMATION PROCESSING METHOD AND MEDIUM FOR STORING INFORMATION PROCESSING PROGRAM

CROSS-REFERENCE TO RELATED APPLICATIONS

This application is based upon and claims the benefit of priority of the prior Japanese Patent Application No. 2011-010755, filed on Jan. 21, 2011, the entire contents of which are incorporated herein by reference.

FIELD

The embodiment discussed herein is related to an information processing apparatus, an information processing method and a medium for storing an information processing program.

BACKGROUND

Hitherto, for information processing devices such as personal computers, there has been proposed a technique in which the size of a region displayed on a display can be increased or reduced by an operation that is performed by a user on, for example, a pointing device having a plate-shaped tablet and a dedicated pen-shaped input device. For example, such an information processing device of the related art, first, reads coordinates of the position of the pen-shaped input device that moves on the tablet in accordance with a user operation, and moves, in accordance with the coordinates of the position of the pen-shaped input device, the position of a cursor that is displayed on the display. Then, when the pen-shaped input device approaches the tablet, the information processing device of the related art performs enlarged display of a region that corresponds to the position of the cursor and that is displayed on the display.

Furthermore, for displays that information processing devices such as personal computers or mobile phones have, there has been proposed a technique, in which character information or the like that is input by a user with a touch operation is recognized. For example, such an information processing device obtains position information that concerns a time series which is continuously input by a user into an input box on a window displayed on a display, and performs a character recognition process on the basis of the obtained position information. Japanese Laid-Open Patent Publication No. 07-219700 and Japanese Laid-Open Patent Publication No. 2001-184458 are examples of the related art.

In the related art described above, for example, when the pen-shaped input device approaches the tablet, display of the region on the display is fixedly performed in a state in which display of the region is enlarged. Consequently, display of the region is fixed to a background of the region, for which enlarged display is performed, in a state in which characters and so forth that exist in the periphery of the region are hidden. For this reason, it is difficult for a user to refer to characters and so forth that exist in the periphery of the region for which enlarged display is performed. In contrast, prevention of display of the region on the display from being fixedly performed in a state in which display of the region is enlarged can also be considered. However, in this case, the region for which enlarged display is performed shifts in accordance with movement of the pen-shaped input device that is used to input characters into the region for which enlarged display is performed. Thus, this is not useful for a user who desires to input characters.

SUMMARY

According to an aspect of the invention, an information processing apparatus includes a memory that stores a first value and a second value smaller than the first value and a processor that executes a process including detecting a position of an object with respect to a screen of a display, determining whether a first distance from the object to the screen is between the first value and the second value on a basis of the position of the object, displaying a first image on the screen when the first distance is determined to be between the first value and the second value, the first image being an enlarged image of an area corresponding to the position of the object, determining whether the first distance is equal to or less than the second value on a basis of the position of the object and displaying a second image when the first distance is determined to be equal to or less than the second value, the second image being displayed on the screen when the first distance decreases to be the second value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Embodiments that are described below as embodiments of an information processing device and an information processing program disclosed herein do not limit the techniques disclosed herein, and can be appropriately combined with each other to such an extent that no discrepancies arise in the contents of processes.

First Embodiment

Figure 1:
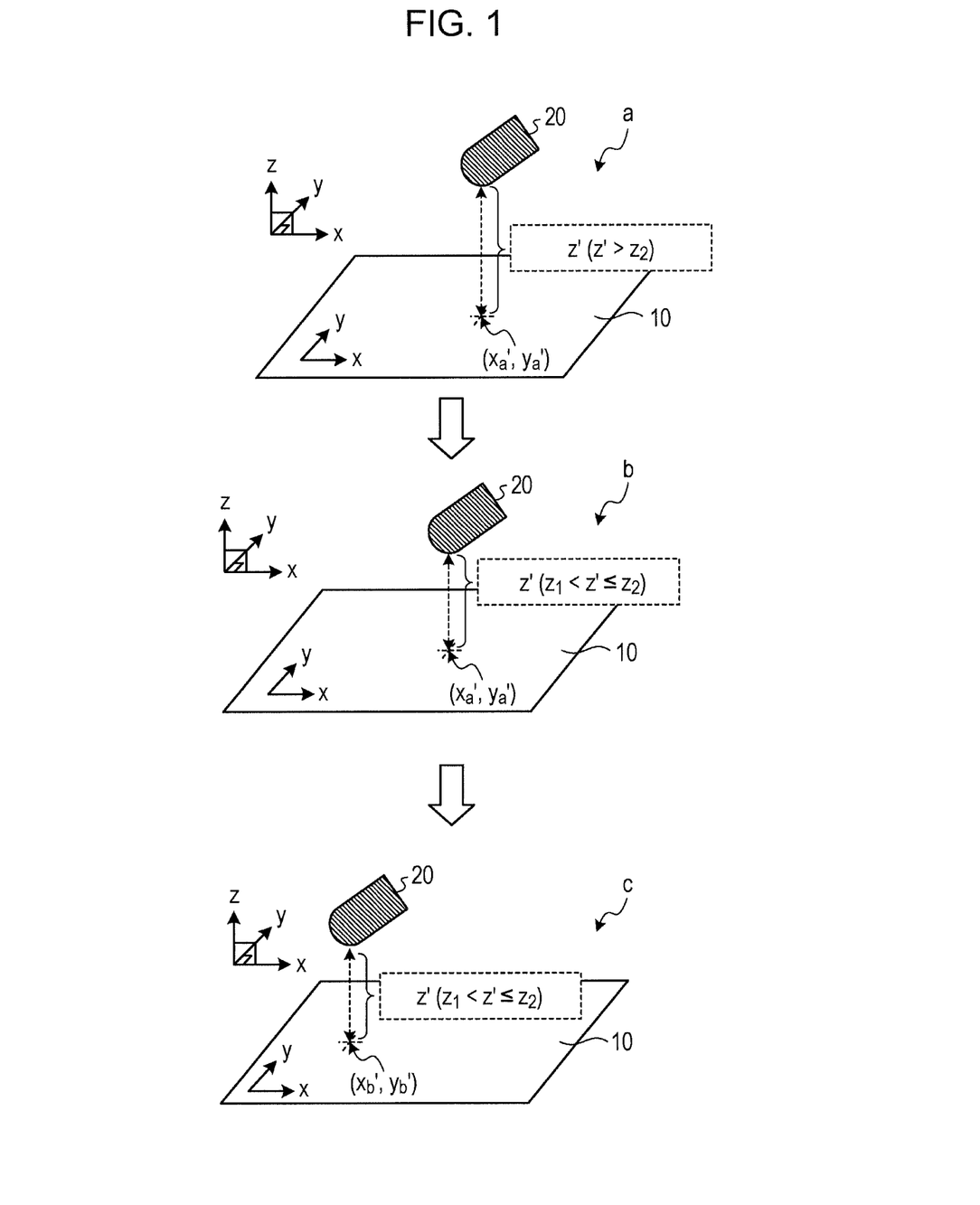
FIG. 1 is a diagram used to describe an information processing device according to a first embodiment.
Figure 2:
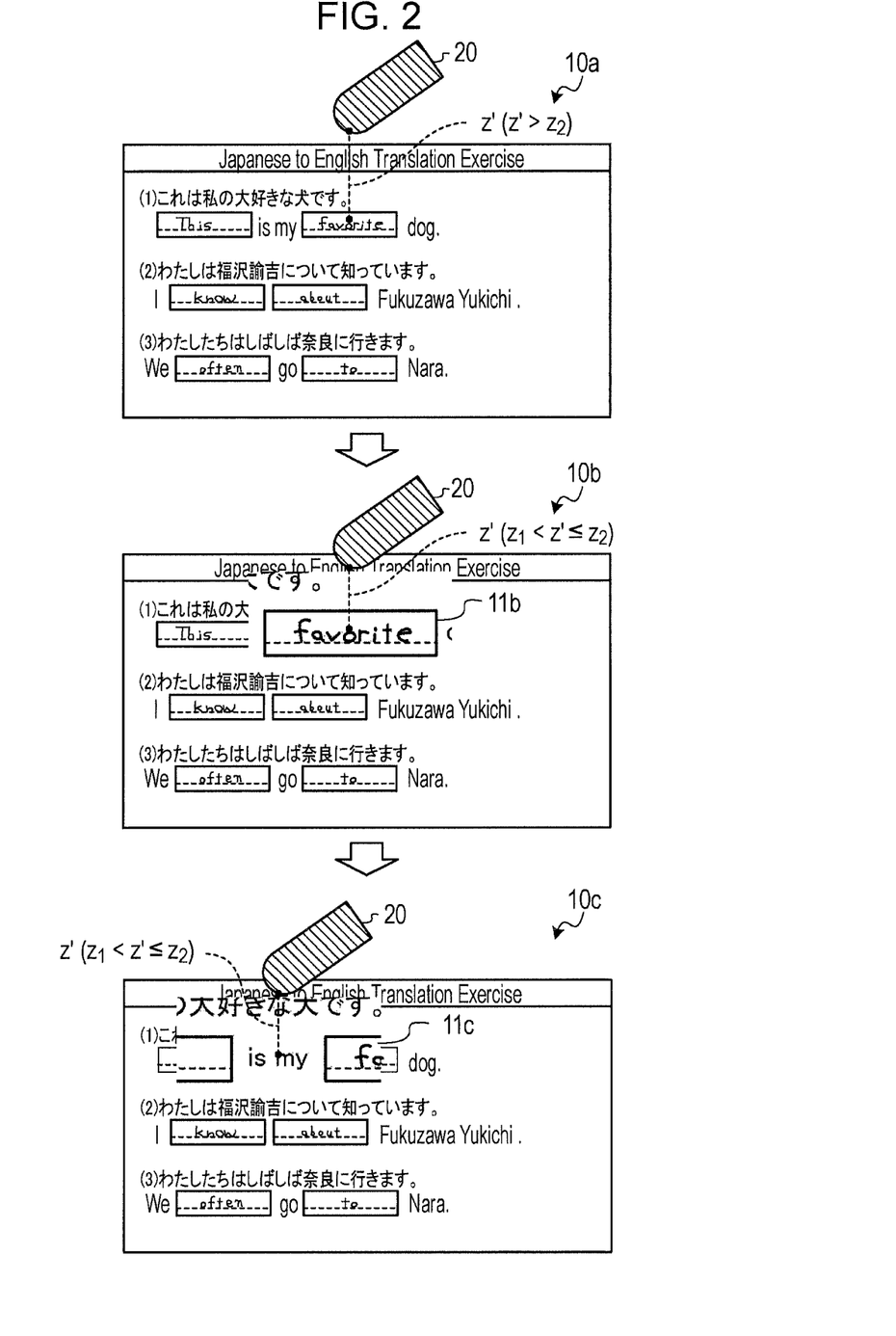
FIG. 2 is a diagram used to describe the information processing device according to the first embodiment.
Figure 3:
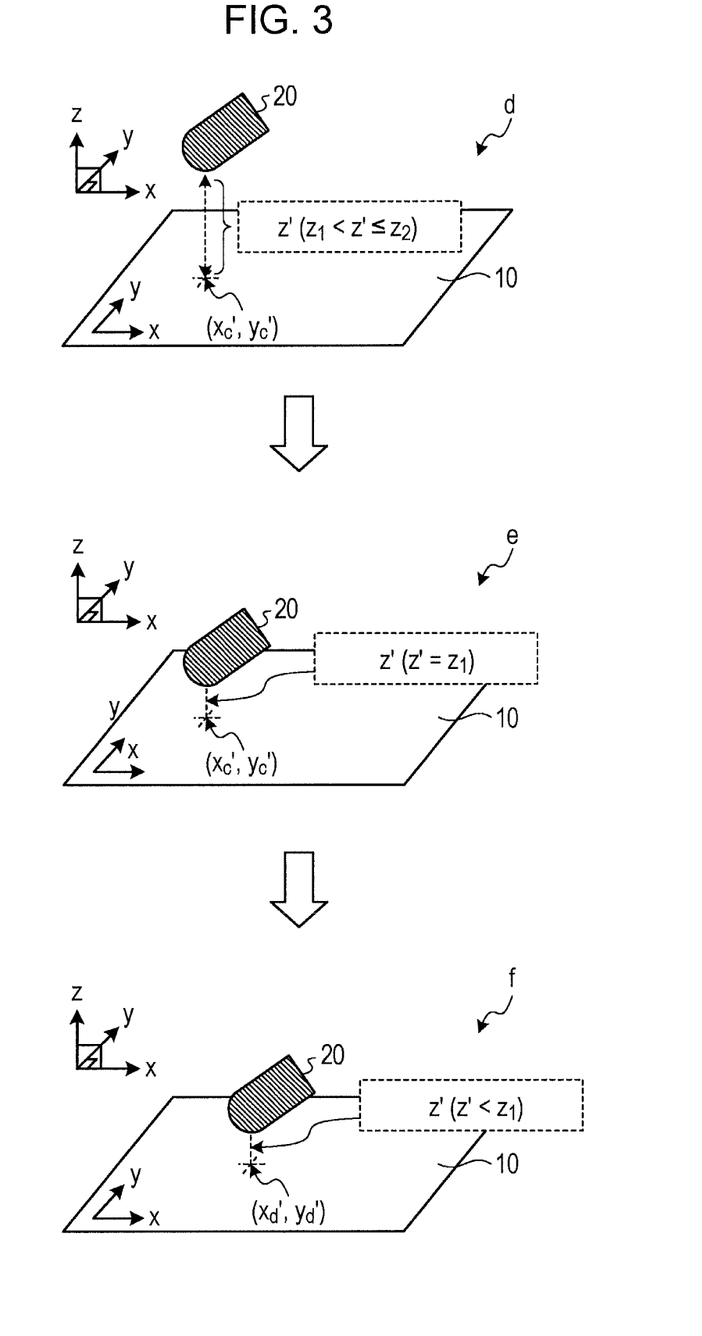
FIG. 3 is a diagram used to describe the information processing device according to the first embodiment.
Figure 4:
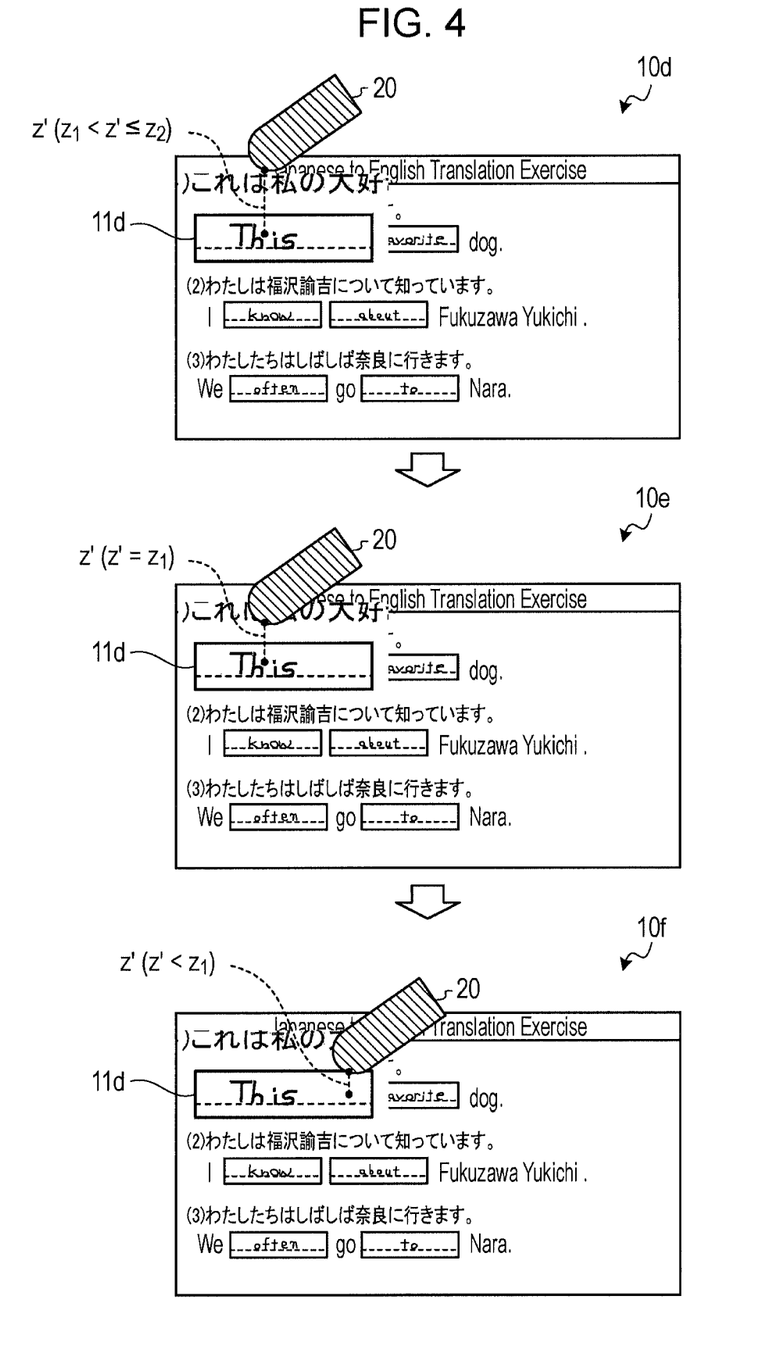
FIG. 4 is a diagram used to describe the information processing device according to the first embodiment.

FIGS. 1 to 4 are diagrams used to describe an information processing device according to a first embodiment. FIGS. 1 and 3 illustrate changes in the positional relationship between a display face 10 of a display section that the information processing device has and a finger 20 of a user who performs a touch operation on the display face. FIG. 2 illustrates examples of display regions in a case represented by positional relationships between the display face and the finger which are illustrated in FIG. 1. FIG. 4 illustrates examples of display regions in a case represented by positional relationships between the display face and the finger which are illustrated in FIG. 3. Note that display regions 10a to 10f are regions in which information is displayed on the display face.

Furthermore, x and y illustrated in FIGS. 1 and 3 are coordinate axes for determining a position provided within the display face, and are orthogonal to each other. Furthermore, z illustrated in FIGS. 1 and 3 is a coordinate axis for determining the position of the finger with respect to the display face.

As described below, the information processing device according to the first embodiment successively detects the coordinates of a three-dimensional position of the finger 20 with respect to the display face 10, and performs display control on the display face 10 on the basis of the positional relationship between the display face 10 and the finger 20.

FIG. 1 illustrates changes in the positional relationship between the finger 20 and the display face 10 in a case in which the finger 20 of the user approaches the display face 10 and then moves in the horizontal direction. When a height "z'" of the finger 20 from the display face 10 is in a range represented by a relationship "$z'>z_2$" as indicated in a positional relationship a illustrated in FIG. 1, the information processing device according to the first embodiment does not perform a process of enlarging a display region of the display face 10. In other words, as indicated in the display region 10a illustrated in FIG. 2, enlarged display is not performed by the information processing device according to the first embodiment for, among display regions provided within the display face 10, a display region corresponding to any one of the items of "Japanese to English Translation Exercise" displayed on the display face 10.

Next, as indicated in a positional relationship b illustrated in FIG. 1, when the finger 20 approaches the display face 10 and the height "z'" of the finger 20 from the display face 10 is in a range represented by a relationship "$z_1<z'\le z_2$", the information processing device according to the first embodiment performs enlarged display of a display region of the display face 10 in accordance with a position $(x_a', y_a')$ of the finger 20. In other words, as indicated in the display region 10b illustrated in FIG. 2, enlarged display of a display region 11b among the display regions provided within the display face 10 is performed by the information processing device according to the first embodiment. A portion of the display region 11b which corresponds to the position $(x_a', y_a')$ of the finger 20 and in which "o" of "favorite" is displayed is located at the center of the display region 11b.

Next, as indicated in a positional relationship c illustrated in FIG. 1, when the finger 20 moves the display face 10 and the height "z'" of the finger 20 from the display face 10 is in the range represented by the relationship "$z_1<z'\le z_2$", the information processing device according to the first embodiment performs enlarged display of a display region of the display face 10 in accordance with a position $(x_b', y_b')$, to which the finger 20 has moved, of the finger 20. In other words, as indicated in the display region 10c illustrated in FIG. 2, enlarged display of a display region 11c is performed by the information processing device according to the first embodiment. A portion of the display region 11c which corresponds to the position $(x_b', y_b')$ of the finger 20 and in which "m" of "my" is displayed is located at the center of the display region 11c.

In this manner, when the finger 20 approaches the display face 10, the information processing device according to the first embodiment performs enlarged display of a display region provided within the display face 10, and flexibly changes, in accordance with movement of the finger 20, the region for which enlarged display is performed. For this reason, as indicated in the display region 10b illustrated in FIG. 2, even when a portion of a display region in which "is my" is displayed is hidden behind the display region 11b for which enlarged display is performed, as indicated in the display region 10c illustrated in FIG. 2, enlarged display of the display region 11c including "is my" can be performed in accordance with movement of the finger 20. Accordingly, the user can refer to characters and so forth that exist in the periphery of enlarged display of the region.

Next, FIG. 3 illustrates positional relationships between the finger 20 and the display face 10 in a case in which the finger 20 approaches the display face 10 and then moves in the horizontal direction. As indicated in a relationship d illustrated in FIG. 3, when the finger 20 approaches the display face 10 and the height "z'" of the finger 20 from the display face 10 is in the range represented by the relationship "$z_1<z'\le z_2$", the information processing device according to the first embodiment performs enlarged display of a display region of the display face 10 in accordance with a position $(x_c', y_c')$ of the finger 20. In other words, as indicated in the display region 10d illustrated in FIG. 4, enlarged display of a display region 11d among the display regions provided within the display face 10 is performed by the information processing device according to the first embodiment. A portion of the display region 11d which corresponds to the position $(x_c', y_c')$ of the finger 20 and which is almost located between "h" and "i" of "This" is located at the center of the display region 11d. Up to this point, this case is similar to the case that is indicated in the positional relationship a illustrated in FIG. 1 and in the display region 10a illustrated in FIG. 2.

Next, as indicated in a relationship e illustrated in FIG. 3, at a point in time when the finger 20 approaches the display face 10 and the height "z'" of the finger 20 from the display face 10 becomes a value so that an equation "$z'=z_1$" is satisfied, the information processing device according to the first embodiment fixedly performs enlarged display of the display region for which enlarged display is performed in accordance with the position $(x_c', y_c')$ of the finger 20 at this point in time. In other words, as indicated in the display region 10e illustrated in FIG. 4, among the display regions provided within the display face 10, enlarged display of the display region 11d is fixedly performed by the information processing device according to the first embodiment. A portion of the display region 11d which corresponds to the position $(x_c', y_c')$ of the finger 20 and which is almost located between "h" and "i" of "This" is located at the center of the display region 11d.

Then, after enlarged display of the display region is fixedly performed, even when the finger 20 moves as indicated in a positional relationship f illustrated in FIG. 4, in a case in which the height "z'" of the finger 20 from the display face 10 is in a range represented by a relationship "$z'<z_1$", the information processing device according to the first embodiment continues fixedly performing enlarged display of the display region for which enlarged display is performed. In other words, as indicated in the positional relationship f illustrated in FIG. 3, even when the position of the finger 20 moves from the position $(x_c', y_c')$ to the position $(x_d', y_d')$ after enlarged display is fixedly performed, fixedly performing of enlarged display of the display region 11d is continued by the information processing device according to the first embodiment.

Accordingly, the information processing device according to the first embodiment fixedly performs enlarged display of a display region in accordance with an approach of the finger 20 to the display face 10. For this reason, even when the finger 20 moves, as indicated in the relationship f illustrated in FIG. 4, a display region for which enlarged display is performed does not shift in accordance with movement of the finger.

Accordingly, the information processing device according to the first embodiment is useful for a user who desires to input characters in a region for which enlarged display is performed.

As described above, when the finger 20 approaches the display face 10, the information processing device according to the first embodiment performs enlarged display of a display region provided within the display face 10, and flexibly changes, in accordance with movement of the finger 20, the region for which enlarged display is performed. Furthermore, when the finger 20 further approaches the display face 10, the information processing device according to the first embodiment fixedly performs enlarged display of the display region. Typically, a user performs an intuitive action of causing his/her finger to approach an item that the user desires to perform enlarged display for and to refer to, moving the finger, and causing the finger to further approach an item on which the user desires to perform an operation. The information processing device according to the first embodiment can perform enlarged display in accordance with such an intuitive action of a user, and can realize both an enlarged display for facilitating reference and enlarged display for facilitating an input operation.

[Configuration of Information Processing Device (First Embodiment)]

Figure 5:
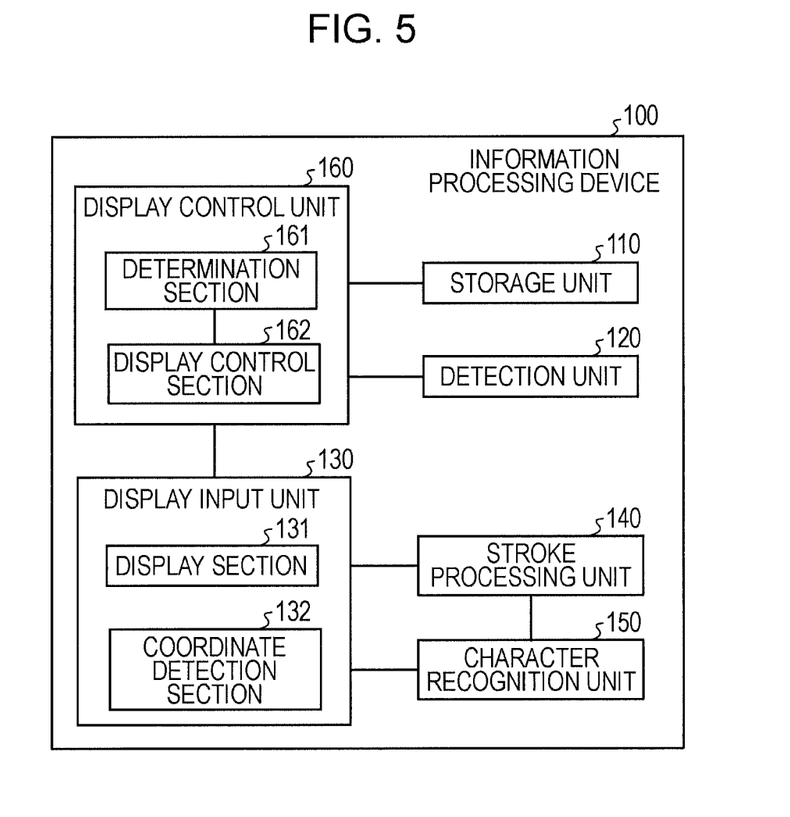
FIG. 5 is a functional block diagram illustrating a configuration of the information processing device according to the first embodiment.

FIG. 5 is a functional block diagram illustrating a configuration of the information processing device according to the first embodiment. As illustrated in FIG. 5, an information processing device 100 according to the first embodiment includes a storage unit 110, a detection unit 120, a display input unit 130, a stroke processing unit 140, a character recognition unit 150, and a display control unit 160. Note that, in FIG. 5, only functional blocks that are necessary in order to describe the information processing device according to the first embodiment are illustrated.

The storage unit 110 stores information that is to be displayed on a display section 131 described below. For example, the storage unit 110 stores various types of information concerning a window that is to be displayed on the display section 131, and stores information concerning character strings constituting the window or various types of objects on the window, information concerning components corresponding to individual functions of the window, and so forth. The storage unit 110 stores, as the information concerning the various types of objects, the arrangement positions (coordinates) of input boxes on the window, the sizes of the input boxes, and so forth.

The detection unit 120 successively detects the coordinates of a three-dimensional position of an object with respect to the display section 131 described below. For example, the detection unit 120 measures, using an existing capacitive sensing method or the like, a change in a capacitance in a case in which a finger of a user approaches the display section 131, thereby detecting a three-dimensional position of the finger, which is located away from the display section 131, of the user and detecting the coordinates corresponding to the detected position. Note that detection with the detection unit 120 is not limited to detection of the coordinates of a three-dimensional position of the finger using the capacitive sensing method. For example, the detection unit 120 captures, using a camera or the like, an image indicating a positional relationship between the display section 131 and the finger, and analyses the image obtained by image capture, whereby the detection unit 120 can detect the coordinates of a three-dimensional position of the finger.

The display input unit 130 has the display section 131 and a coordinate detection section 132 as illustrated in FIG. 5.

Note that, hereinafter, a state in which the finger of the user is in contact with the display section 131 is referred to as a "touch state", and the position of the finger, which is in contact with the display section 131, of the user is referred to as "touch coordinates".

The display section 131 displays, under control of the display control unit 160 described below, the information that is stored in the storage unit 110. For example, the display section 131 refers to the information stored in the storage unit 110, and displays the information concerning character strings constituting the window or various types of objects on the window. Furthermore, the display section 131 displays, using reverse display in a default color, on the basis of individual coordinates transmitted from the character recognition unit 150 described below, pixels corresponding the individual coordinates, thereby displaying a recognition result obtained by the character recognition unit 150 described below, i.e., characters that have been input by the user. The display section 131 displays, in an active input box on the window, characters that have been input by the user, for example, as illustrated in FIGS. 2 and 4 described above.

When the coordinate detection section 132 receives a notification that the touch state has started from a display control section 162 described below, the coordinate detection section 132 successively detects touch coordinates (x', y') at a predetermined sampling rate. Then, the coordinate detection section 132 transmits the detected touch coordinates (x', y') to the stroke processing unit 140 described below. Furthermore, when the coordinate detection section 132 does not detect the touch coordinates for a predetermined time at a rate within the predetermined sampling rate, the coordinate detection section 132 transmits a notification that the touch state has finished to the stroke processing unit 140 described below.

When the stroke processing unit 140 receives a notification that the touch state has started from the display control section 162 described below, every time the stroke processing unit 140 obtains the touch coordinates detected by the coordinate detection section 132, the stroke processing unit 140 successively stores data regarding the obtained touch coordinates and time data so that the data regarding the touch coordinates and the time data are associated with each other. Here, a series of data regarding the touch coordinates are stored as a time series in a built-in storage section, and is referred to as "stroke information". Then, when the stroke processing unit 140 determines that the touch state has finished, the stroke processing unit 140 requests the character recognition unit 150 to perform a touch finish process, and transmits a notification that the touch state has finished to the display control section 162. The character recognition unit 150 performs the character recognition process using the stroke information stored in the stroke processing unit 140.

Processes performed by the stroke processing unit 140 and the character recognition unit 150 are realized using an existing technique disclosed in Japanese Patent No. 2581692, Japanese Unexamined Patent Application Publication No. 2000-105798, or the like. However, an example of a processing method will be described below.

Basically, the stroke processing unit 140 successively stores the above-mentioned stroke information, and requests the character recognition unit 150 to perform a touch start-time process, a touch continuation process, and the touch finish process. For example, when the stroke processing unit 140 receives a notification that the touch state has started from the display control section 162, the stroke processing unit 140 requests the character recognition unit 150, which is described below, to perform the touch start-time process. Next, the stroke processing unit 140 obtains data regarding the touch coordinates from the coordinate detection section 132, and stores time data so that the time data is associated with the data regarding the touch coordinates. Then, the stroke processing unit 140 determines, on the basis of whether or not the stroke processing unit 140 has received a notification that the touch state has finished from the coordinate detection section 132, whether or not the touch state has finished. For example, when the stroke processing unit 140 has received a notification that the touch state has finished from the coordinate detection section 132, the stroke processing unit 140 determines that the touch state has finished, and requests the character recognition unit 150, which is described below, to perform the touch finish process. In contrast, when the stroke processing unit 140 has not received a notification that the touch state has finished from the coordinate detection section 132, the stroke processing unit 140 determines that the touch state has not finished, and requests the character recognition unit 150, which is described below, to perform the touch continuation process.

When the character recognition unit 150 receives a request from the stroke processing unit 140, the character recognition unit 150 successively obtains the stroke information from the stroke processing unit 140, and performs the character recognition process. Note that the character recognition unit 150 receives each of requests for the touch start-time process, the touch continuation process, and the touch finish process from the stroke processing unit 140, and performs the character recognition process in accordance with the request. The character recognition unit 150 transmits information concerning coordinates at which a recognized character is formed to the display input unit 130.

Note that the touch start-time process is a process that includes, for example, a process of determining a break between characters. For example, in the touch start-time process, whether or not a time period between a touch start time and a time at which the previous stroke processing finished exceeds a threshold that is specified in advance is determined. Then, in the touch start-time process, as a result of determination, when the time period exceeds the threshold, a group of strokes that have been accumulated up until when the previous stroke processing finished is treated as a single character. The touch continuation process is a process that includes, for example, a process of feeding back a writing path of a character and displaying the writing path on the display section 131, and a process of predicting the remaining writing path of a stroke of a character, feeding back a prediction result, and displaying the prediction result on the display section 131. The touch finish process is a process that includes, for example, a process of predicting the next stroke and displaying the next stroke on the display section 131, and a process of estimating a prediction candidate character string from a partial character string.

Note that, although the stroke processing unit 140 requests the character recognition unit 150 to perform a process and the character recognition unit 150 performs the character recognition process in accordance with the request from the stroke processing unit 140, the procedure is not limited to the above-described procedure, and the following procedure may be used. For example, the stroke processing unit 140 transmits only a notification that the touch state has finished to the character recognition unit 150. When the character recognition unit 150 receives a notification that the touch state has finished from the stroke processing unit 140, the character recognition unit 150 performs the character recognition process using the stroke information that has already been stored.

The display control unit 160 includes a determination section 161 and the display control section 162 as illustrated in FIG. 5.

The determination section 161 successively obtains coordinates detected by the detection unit 120, and determines, on the basis of the obtained coordinates, whether or not the distance between the finger of the user and the display face of the display section 131 is equal to or less than a fixed distance. For example, when the determination section 161 receives coordinates from the detection unit 120, the determination section 161 determines whether or not the value "z'" of a z coordinate detected by the detection unit 120 is equal to or smaller than "$z_2$" (whether or not a relationship "$z' \leq z_2$" is satisfied). As a result of determination, when the relationship "$z' \leq z_2$" is satisfied, the determination section 161 requests the display control section 162 to perform enlarged display of a region that corresponds to the coordinates detected by detection unit 120 and that is provided within the display face of the display section 131. For example, the determination section 161 requests to perform enlarged display of a region having a center that is located at a position which corresponds to a value "x'" of an x coordinate and a value "y'" of a y coordinate detected by the detection unit 120, and which is provided in an xy-plane of the display face so that the region has a predetermined size. In contrast, as a result of determination, when the relationship "$z' \leq z_2$" is not satisfied, the determination section 161 waits until the determination section 161 receives the next coordinates from the detection unit 120. When the determination section 161 receives the next coordinates, the determination section 161 returns so as to determine whether or not the relationship "$z' z_2$" is satisfied.

Furthermore, after enlarged display of the region is performed by the display control section 162, the determination section 161 determines whether or not a value "z'" of a z coordinate is equal to or smaller than "$z_1$" (whether or not a relationship "$z' \leq z_1$" is satisfied). As a result of determination, when the relationship "$z' \leq z_1$" is satisfied, the determination section 161 requests the display control section 162 to fixedly perform enlarged display of the region for a predetermined time. In contrast, as a result of determination, when the relationship "$z' \leq z_1$" is not satisfied, the determination section 161 waits until the determination section 161 receives the next coordinates from the detection unit 120. When the determination section 161 receives the next coordinates, the determination section 161 returns so as to determine whether or not the relationship "$z' \leq z_2$" is satisfied.

As described above, every time the detection unit 120 obtains coordinates detected by the detection unit 120, the determination section 161 determines whether or not the relationship "$z' \leq z_2$" is satisfied, and transmits a request that enlarged display of a region be performed to the display control section 162 in accordance with a result of determination. Then, the determination section 161 determines whether or not the relationship "$z' \leq z_1$" is satisfied, and transmits a request that enlarged display of the region be fixedly performed to the display control section 162 in accordance with a result of determination. In this manner, while the position of the finger is being detected by the detection unit 120, the determination section 161 repeatedly performs determination regarding the distance between the finger of the user and the display face of the display section 131.

When the display control section 162 receives from a request from the determination section 161, the display control section 162 performs display control on the display section 131. Note that information or input boxes that are displayed in the window, character information that is obtained in real time by the character recognition process performed by the character recognition unit 150, and so forth are displayed in display regions displayed on the display face of the display section 131. For example, when the display control section 162 receives a request that enlarged display be performed from the determination section 161, the display control section 162 determines the position (x', y') that corresponds to the value "x'" of an x coordinate and the value "y'" of a y coordinate detected by the detection unit 120, and that is provided in the xy-plane of the display face. Then, the display control section 162 obtains information concerning the determined position (x', y') from the storage unit 110, and performs enlarged display of a display region that corresponds to the determined position (x', y') and that is provided within the display face. For example, the display control section 162 cuts out a display region of the display face so that a pixel corresponding to the position (x', y') provided within the display face is located at the center of the display region and the display region has a predetermined size. Then, the display control section 162 enlarges, with a predetermined scaling factor, individual pixels included in the display region that has been cut out. The display control section 162 superimposes the pixels on the entire display region, and displays the display region on the display section 131. Note that, after the display control section 162 performs enlarged display of the display region corresponding to the position of the finger 20, when a different position is detected as the next position of the finger 20, the display control section 162 flexibly changes, in accordance with the position of the finger 20, the region for which enlarged display is performed. For example, the display control section 162 returns the size of the display region for which enlarged display is performed at the previous position of the finger to the original size, and performs enlarged display of a display region corresponding to the present position of the finger 20.

Furthermore, a case is described, in which the display control section 162 determines the position (x', y') that corresponds to an x coordinate and a y coordinate (a position of the finger) detected by the detection unit 120, and that is provided in the xy-plane of the display face, and in which the display control section 162 performs enlarged display of a display region that corresponds to the determined position (x', y') and that is provided within the display face. However, the present invention is not limited thereto. The following process may be performed. For example, the display control section 162 determines whether or not an input box exists at the position (x', y') that corresponds to an x coordinate and a y coordinate detected by the detection unit 120, and that is provided in the xy-plane of the display face. Then, when an input box exists, the information processing device 100 performs enlarged display of the only input box among display regions with a predetermined scaling factor on the display section 131. Alternatively, the information processing device 100 cuts out a region that includes the input box and that has a predetermined size among display regions, and performs enlarged display of the region, which has been cut out, with a predetermined scaling factor on the display section 131.

Note that, when the display control section 162 determines whether or not an input box exists at the position (x', y') in the xy-plane of the display face and no input box exists as a result of determination, for example, the display control section 162 does not perform enlarged display, and waits until the display control section 162 receives the next request from the determination section 161.

Furthermore, when the display control section 162 receives a request that enlarged display of a display region be fixedly performed from the determination section 161, the display control section 162 fixedly performs enlarged display of a display region for which enlarged display is performed at a point in time when the display control section 162 receives the request (hereinafter, referred so as a "fixedly performing of enlarged display"). Then, after the display control section 162 starts fixedly performing enlarged display, the display control section 162 successively receives coordinates detected by the detection unit 120, and repeatedly determines, on the basis of the received coordinates, whether or not the touch state has stared. For example, the display control section 162 determines whether or not the value "z'" of a z coordinate detected by the detection unit 120 is "0", thereby determining whether or not the touch state has stared. As a result of determination, when the value "z'" of the z coordinate is "0", the display control section 162 transmits a notification that the touch state has started to the coordinate detection section 132 and the stroke processing unit 140 which are described above.

In contrast, as a result of determination, when the value "z'" of the z coordinate is not "0", i.e., when the touch state has not started, the display control section 162 determines whether or not the positional relationship between the finger and the display face satisfies a condition under which fixedly performing of enlarged display is stopped. The display control section 162 employs, as the condition under which fixedly performing of enlarged display is stopped, for example, a condition where a state in which the finger is located a distance of $z_1$ or more from the display face continues for a predetermined time. Then, when the display control section 162 determines that the positional relationship between the finger and the display face satisfies the condition under which fixedly performing of enlarged display is stopped, the display control section 162 stops fixedly performing of enlarged display. Hereinafter, the condition under which fixedly performing of enlarged display is stopped will be described with reference to FIG. 6.

Figure 6:
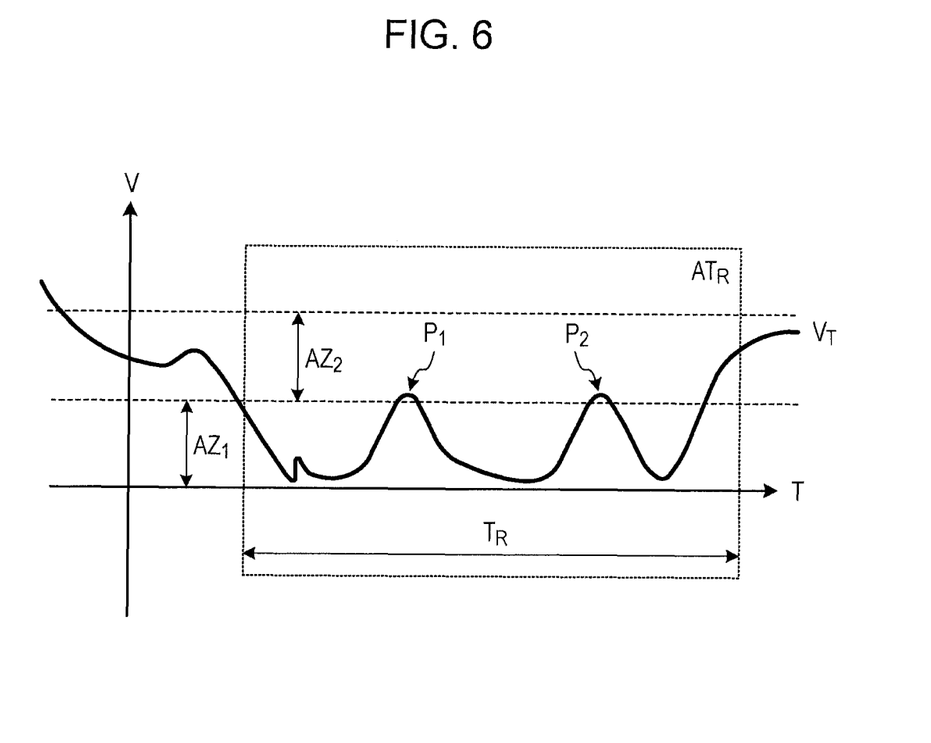
FIG. 6 is a diagram used to describe a display control section in the first embodiment.

FIG. 6 is a diagram used to describe the display control section in the first embodiment. FIG. 6 is a graph illustrating change in a time series of the positional relationship between the finger of the user and the display face of the display section 131. The vertical axis "V" of the graph illustrated in FIG. 6 indicates the distance between the finger and the display face. The horizontal axis "T" of the graph illustrated in FIG. 6 indicates time. Reference numeral $V_T$ of the graph illustrated in FIG. 6 denotes a curve representing change in a time series of the distance between the finger and the display face. Furthermore, reference numeral $AT_R$ illustrated in FIG. 6 denotes a region in which fixedly performing of enlarged display is continued on the graph. Reference numeral $T_R$ illustrated in FIG. 6 denotes a time for which fixedly performing of enlarged display is continued. Reference numeral $AZ_1$ illustrated in FIG. 6 denotes a region in which the distance between the finger and the display face is equal to or less than $z_1$ on the graph. Additionally, reference numeral $AZ_2$ illustrated in FIG. 6 denotes a region in which the distance between the finger and the display face is equal to or less than $z_2$ on the graph.

In a case in which the finger is moved off the display face and becomes located a distance of $z_1$ or more from the display face as indicated by points $P_1$ and $P_2$ illustrated in FIG. 6, the display control section 162 employs, as the condition under which fixedly performing of enlarged display is stopped, a condition where a state in which the finger is located a distance of $z_1$ or more from the display face continues. In other words, even in the case in which the finger is moved off the display face and becomes located a distance of $z_1$ or more from the display face, so long as the state in which the finger is located a distance of $z_1$ or more from the display face does not continue for a long time, the display control section 162 continues fixedly performing enlarged display. For example, a case can also be considered, in which the user moves off the finger the display face so that the finger becomes located a distance of $z_1$ or more from the display face while the user is inputting a character into an input box for which enlarged display is performed. Even in such a case, when a time for which the finger is located a distance of $z_1$ or more from the display face is a very short time, this is treated as an exceptional event, and fixedly performing of enlarged display is continued by the display control section 162. The aim of this is improvement of user convenience in the case of inputting a character.

As a result of determination described above, when the positional relationship between the finger and the display face satisfies the condition under which fixedly performing of enlarged display is stopped, the display control section 162 stops fixedly performing of enlarged display, and returns the size of a display region for which enlarged display on the display section 131 is performed to the size of the display region prior to being enlarged. For example, the display control section 162 reduces, on the basis of a predetermined scaling factor that was used in a case of performing enlarged display of the display region, the size of individual pixels included in the display region for which enlarged display is performed, thereby retuning the size of the display region to the size of the display region prior to being enlarged. Note that, even when a character has been input by the user into the display region for which enlarged display is fixedly performed, the size of individual pixels that are displayed using reverse display as the character is reduced, whereby the size of the character is also reduced so as to fit to the size of the display region prior to being enlarged. In contrast, as a result of determination, when the positional relationship between the finger and the display face does not satisfy the condition under which fixedly performing of enlarged display is stopped, the display control section 162 waits until the display control section 162 receives the next coordinates from the detection unit 120. When the display control section 162 receives the next coordinates, the display control section 162 returns so as to determine whether or not the touch state has started, which is described above.

Note that a condition employed as the condition under which fixedly performing of enlarged display is stopped is not limited to a condition where the state in which the finger is located a distance of $z_1$ or more from the display face continues for a predetermined time. For example, the display control section 162 can employ, as the condition under which fixedly performing of enlarged display is stopped, the following: a condition where a distance through which the finger has moved in the horizontal direction in a state in which the finger is located a distance of $z_1$ or more and $z_2$ or less from the display face is equal to or more than a predetermined distance; or a condition where the finger is located outside the display region for which enlarged display is fixedly performed. The aim of providing these conditions under which fixedly performing of enlarged display is stopped is to handle the following: a state in which there is a low possibility that a user operation will be performed on a display region for which enlarged display is fixedly performed; or a state in which it is less necessary to continue fixedly performing of enlarged display. Note that, the display control section 162 can employ at least one of the individual conditions under which fixedly performing of enlarged display is stopped, which are above described or employ, in combination, some of the individual conditions under which fixedly performing of enlarged display is stopped.

As described above, after the display control section 162 starts fixedly performing enlarged display, the display control section 162 sequentially performs determination of whether or not the touch state has started, and determination of whether or not fixedly performing of enlarged display is to be stopped. Note that, also when the display control section 162 receives a notification that the touch state has finished from the stroke processing unit 140 described above, the display control section 162 sequentially performs determination of whether or not the touch state has started, and determination of whether or not fixedly performing of enlarged display is to be stopped.

Note that the storage unit 110 illustrated in FIG. 5 may be a semiconductor memory element such as a random access memory (RAM) or a flash memory. Moreover, the display control unit 160 illustrated in FIG. 5 includes a storage section that may be a semiconductor memory element such as an RAM or a flash memory. Furthermore, the detection unit 120, the display input unit 130, the stroke processing unit 140, the character recognition unit 150, and the display control unit 160, which are illustrated in FIG. 5, may be configured as an electronic circuit or an integrated circuit. Note that examples of the electronic circuit include a central processing unit (CPU) and a microprocessing unit (MPU). Additionally, examples of the integrated circuit include an application specific integrated circuit (ASIC) and a field programmable gate array (FPGA).

[Process Performed by Information Processing Device (First Embodiment)]

Figure 7:
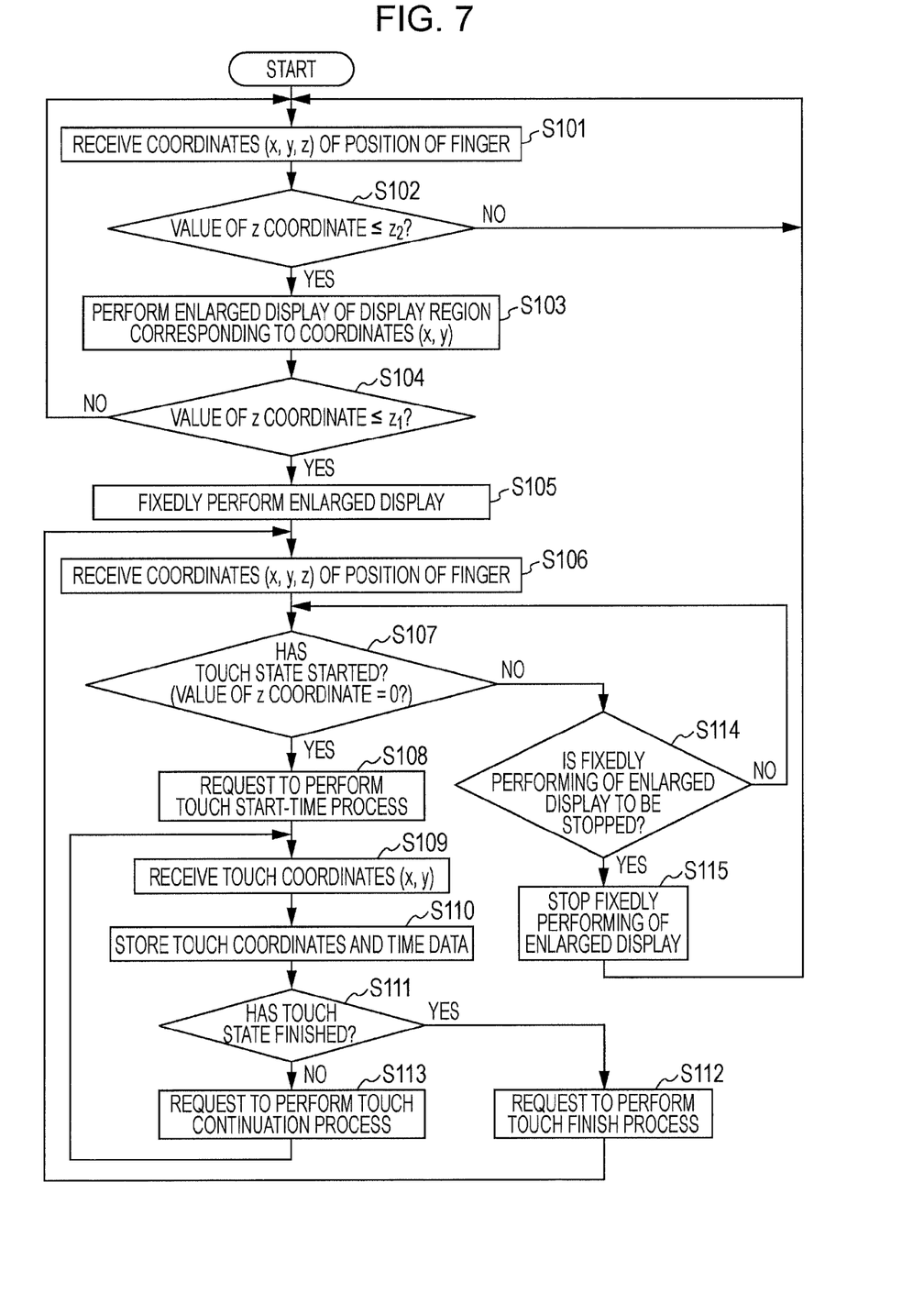
FIG. 7 is a diagram illustrating a flow of a process performed by the information processing device according to the first embodiment.

FIG. 7 is a diagram illustrating a flow of a process performed by the information processing device according to the first embodiment. Note that the process illustrated in FIG. 7 is repeatedly performed, for example, in a case in which a window or the like is displayed on the display section 131.

As illustrated in FIG. 7, the determination section 161 receives coordinates (x, y, z) from the detection unit 120 (step S101).

Next, the determination section 161 determines whether or not the z coordinate detected by the detection unit 120 is equal to or smaller than "$z_2$", i.e., whether or not a relationship "$z \leq z_2$" is satisfied (step S102). As a result of determination, when the relationship "$z \leq z_2$" is satisfied (YES in step S102), the display control section 162 performs enlarged display of a peripheral region of the coordinates (x, y) (step S103). Then, the determination section 161 determines whether or not the z coordinate is equal to or smaller than "$z_1$", i.e., whether or not a relationship "$z \leq z_1$" is satisfied (step S104). As a result of determination, when the relationship "$z \leq z_1$" is satisfied (YES in step S104), the display control section 162 fixedly performs enlarged display of the region on the display section 131 (step S105).

Next, the display control section 162 receives the coordinates (x, y, z) from the detection unit 120 (step S106), and determines, on the basis of the received coordinates, whether or not the touch state has started (step S107). As a result of determination, when it is determined that the touch state has started (YES in step S107), the stroke processing unit 140 requests the character recognition unit 150 to perform the touch start-time process (step S108).

Then, the stroke processing unit 140 receives data regarding the touch coordinates (x, y) from the coordinate detection section 132 (step S109), and stores the data regarding the touch coordinates and time data so that the data regarding the touch coordinates and the time data are associated with each other (step S110). Next, the stroke processing unit 140 determines, on the basis of whether or not a notification that the touch state has finished has been received from the coordinate detection section 132, whether or not the touch state has finished (step S111). As a result of determination, when the stroke processing unit 140 has received a notification that the touch state has finished from the coordinate detection section 132, the stroke processing unit 140 determines that the touch state has finished (YES in step S111). The stroke processing unit 140 requests the character recognition unit 150 to perform the touch finish process (step S112). Then, the process returns to step S106 described above. In contrast, when the stroke processing unit 140 has not received a notification that the touch state has finished from the coordinate detection section 132, the stroke processing unit 140 determines that the touch state has not finished (NO in step S111), and requests the character recognition unit 150 to perform the touch continuation process (step S113). Then, the process returns to step S109 described above.

Here, as a result of determination performed in step S107 described above, when it is determined that the touch state has not started (NO in step S107), the display control section 162 determines whether or not fixedly performing of enlarged display of the region is to be stopped (step S114). As a result of determination, the display control section 162 determines that fixedly performing of enlarged display of the region is to be stopped (YES in step S114), the display control section 162 stops fixedly performing of enlarged display of the region (step S115). Then, the process returns to step S101 described above. In contrast, as a result of determination, the display control section 162 determines that fixedly performing of enlarged display of the region is not to be stopped (NO in step S114), the display control section 162 do not stop fixedly performing of enlarged display of the region. Then, the process returns to step S107 described above.

Here, as a result of determination performed in step S102, when the relationship "$z \leq z_2$" is not satisfied (NO in step S102), the determination section 161 returns to the process performed in step S101 described above. Furthermore, as a result of determination performed in step S104, when the relationship "$z \leq z1$" is not satisfied (NO in step S104), the determination section 161 returns to the process performed in step S101 described above.

Note that steps S108 to S113 described above indicate an order in which the stroke information is stored by the stroke processing unit 140, and in which a request for a process from the stroke processing unit 140 to the character recognition unit 150 is made, and can be performed using existing techniques. The order in which the processes in steps S108 to S113 described above are performed is not limited to the order illustrated in FIG. 7. The processes can be appropriately rearranged and performed in another order, or the order can be appropriately modified to such an extent that no discrepancies arise in the contents of processes.

[Effects Obtained by First Embodiment]

As described above, when the height "z'" of the finger of the user from the display face is in the range represented by the relationship "$z_1 < z' \leq z_2$", the information processing device 100 according to the first embodiment performs enlarged display of a display region provided within the display face 10, and flexibly changes, in accordance with movement of the finger 20, the region for which enlarged display is performed. Further, when the height "z'" of the finger of the user from the display face is in the range represented by the relationship "$0 \leq z' \leq z_1$", the information processing device 100 according to the first embodiment fixedly performs enlarged display of the display region for which enlarged display is performed. Accordingly, the information processing device 100 according to the first embodiment can perform enlarged display in accordance with an intuitive action of a user, and can realize both enlarged display for facilitating reference and enlarged display for facilitating an input operation.

Moreover, because the information processing device 100 according to the first embodiment fixedly performs enlarged display of a display region for which enlarged display is performed, for example, regarding a character that is not able to be input with one stroke, inputting of the character into an input box can be prevented from being interrupted.

Additionally, the information processing device 100 according to the first embodiment continues fixedly performing enlarged display of a display region for which enlarged display is performed, as long as a predetermined condition under which fixedly performing of enlarged display is stopped is not satisfied. For this reason, for example, the information processing device 100 according to the first embodiment can prevent, while multiple characters are being input into an input box, inputting of the characters, from being interrupted.

For example, in a case of inputting a character with a touch operation, an operation of moving a pen-shaped input device or a finger upward or downward is performed together.

Here, in a case of writing the left side portion of a hiragana character "い", a user brings the pen-shaped input device into contact with a tablet and performs an operation, until the user finishes writing the left portion of the hiragana character "い". Then, the user moves the pen-shaped input device upward from the tablet once. The user brings the pen-shaped input device into contact with the tablet again and performs an operation, until the user finishes writing the right side portion of the hiragana character "い". In this manner, in a case of inputting a character with a touch operation, upward or downward movement of the pen-shaped input device or the finger is repeated until inputting of the character is completed. In the related art, enlarged display is stopped because the start of a user operation performed on a region for which enlarged display is performed is used as an opportunity to stop performing of enlarged display. Thus, in the related art, when an operation of writing the left side portion of the hiragana character "い" is performed, there is a risk of enlarged display being stopped before writing of the right side portion of the hiragana character "い" is completed because it is determined that a user operation has started. There is also a high probability that such a technique in the related art is not useful for a user who inputs a character. In contrast, according to the first embodiment, as described above, enlarged display can be continued even when a user moves his/her finger off the display face. Thus, user convenience in the case of inputting a character can be improved.

Second Embodiment

Hereinafter, other embodiments of the information processing device and the information processing program disclosed herein will be described.

(1) Device Configurations and so Forth

For example, the configuration of the functional blocks of the information processing device 100 illustrated in FIG. 5 is a conceptual configuration. The information processing device 100 does not necessarily need to be physically configured as illustrated in FIG. 5. For example, the determination section 161 and the display control section 162 of the display control unit 160 illustrated in FIG. 5 may be functionally or physically integrated. In this manner, all of or some of the functional blocks of the information processing device 100 may be configured so as to be functionally or physically separated or integrated in arbitrary units in accordance with various types of loads, a status of use, or the like.

(2) Information Processing Program

Furthermore, the various types of processes performed by the information processing device that is described in the embodiment given above can also be realized by executing a predetermined program with an electronic apparatus such as a microprocessor.

Figure 8:
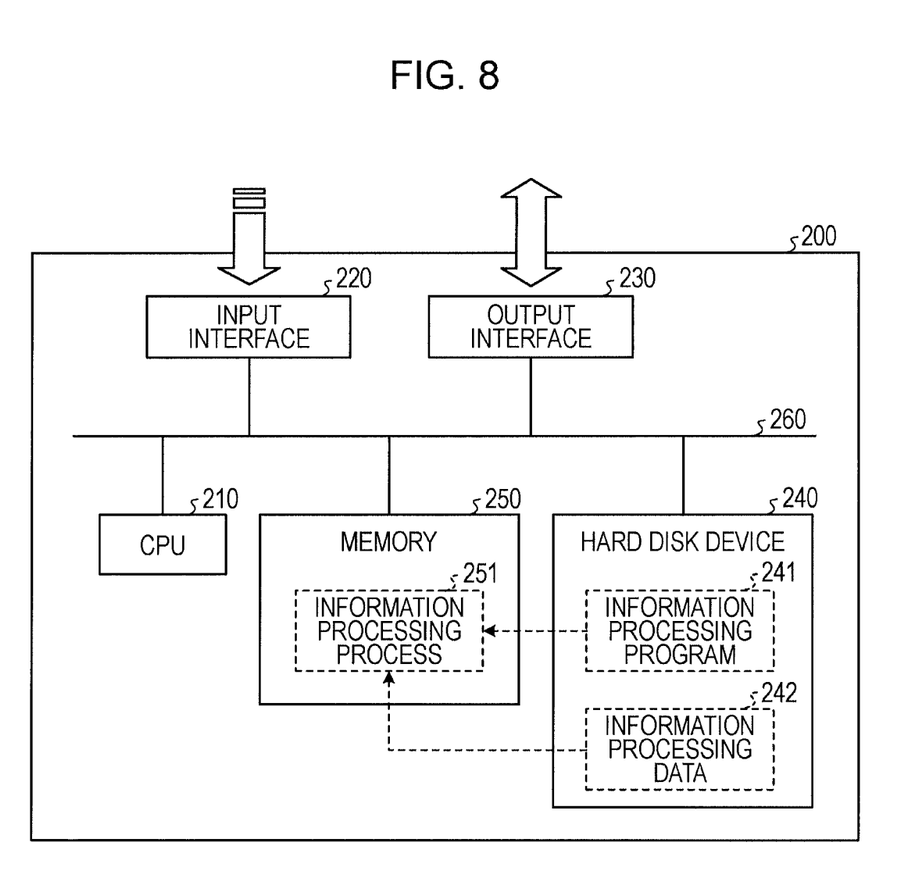
FIG. 8 is a diagram illustrating an example of an electronic apparatus that executes an information processing program.

For this reason, hereinafter, with reference to FIG. 8, an example of a computer that executes an information processing program for realizing functions that are similar to functions realized by the processes performed by the information processing device which is described in the embodiment given above will be described. FIG. 8 is a diagram illustrating an example of an electronic apparatus that executes an information processing program. As illustrated in FIG. 8, an electronic apparatus 200 that realizes the various types of processes performed by the information processing device which is described in the embodiment given above has a CPU 210 that performs various types of arithmetic processes.

Furthermore, as illustrated in FIG. 8, the electronic apparatus 200 has an input interface 220 that receives, as an input, for example, information that is input by a user with a pointing device, a touch panel, or the like, or information concerning a three-dimensional position of the pointing device or a finger of the user. Moreover, as illustrated in FIG. 8, the electronic apparatus 200 has an output interface 230 that is used to output various types of information to a display.

Additionally, as illustrated in FIG. 8, the electronic apparatus 200 has a hard disk device 240 and a memory 250. The hard disk device 240 stores programs, data, and so forth that are used to realize the various types of processes with the CPU 210. The memory 250, such as an RAM, temporarily stores various types of information. The individual devices 210 to 250 are connected to a bus 260.

Note that, the electronic apparatus 200 can also use, instead of the CPU 210, an electronic circuit, such as an MPU, or an integrated circuit, such as an ASIC or a FPGA. Furthermore, the electronic apparatus 200 can also use, instead of the memory 250 such as a RAM, a semiconductor memory element such as a flash memory.

In the hard disk device 240, an information processing program 241 and information processing data 242 that realize functions similar to the functions of the information processing device which is described in the embodiment given above are stored. Note that the electronic apparatus 200 can appropriately distribute and store the information processing program 241 in storage units of multiple computers that are connected to the electronic apparatus 200 via a network so as to be capable of communicating with the electronic apparatus 200.

The CPU 210 reads the information processing program 241 from the hard disk device 240, and loads the information processing program 241 into the memory 250, whereby the information processing program 241 functions as an information processing process 251 as illustrated in FIG. 8. The information processing process 251 reads various types of data such as the information processing data 242 from the hard disk device 240. The information processing process 251 loads the various types of data into a region that is a region of the memory 250 and that is appropriately assigned to the information processing process 251, and performs the various types of processes on the basis of the various types of data that has been loaded.

Note that the information processing process 251 includes, for example, the processes performed by the determination section 161 and the display control section 162 of the display control unit 160 illustrated in FIG. 5, such as the processes performed in steps S101 to S107, S114, and S115 illustrated in FIG. 7.

Note that the information processing program 241 does not necessarily need to be stored in the hard disk device 240 from the beginning. For example, individual programs are stored in "portable physical media" from which data can be read by the electronic apparatus 200 or onto which data can be written by the electronic apparatus 200. Examples of the portable physical media include flexible disks (FDs), compact-disk read-only memories (CD-ROMs), digital versatile discs (DVDs), magneto-optical disks, or integrated circuit (IC) cards. Then, the electronic apparatus 200 may read the individual programs from the portable physical media, and may execute the individual programs.

Alternatively, the individual programs are stored in "other computers (or servers)" that are connected via a public switched telephone network, the Internet, a local area network (LAN), a wide area network (WAN), or the like to an ECU on which the electronic apparatus 200 is mounted. Then, the electronic apparatus 200 may read the individual programs from the computers (or servers), and may execute the individual programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
 a memory that stores a first value and a second value smaller than the first value; and
 a processor coupled to the memory and configured to:
 detect a position of an object with respect to a screen of a display,
 determine whether a first distance from the object to the screen is between the first value and the second value on a basis of the position of the object,
 display a first image on the screen when the first distance is determined to be between the first value and the second value, the first image being an enlarged image of an area corresponding to the position of the object,
 determine whether the first distance is equal to or less than the second value on a basis of the position of the object,
 display a second image when the first distance is determined to be equal to or less than the second value, the second image being displayed on the screen when the first distance decreases to be the second value,
 detect that the first distance becomes more than the second value while displaying the second image,
 determine whether the first distance is more than the second value successively for a first time period after detecting that the first distance becomes more than the second value, and
 when the first distance is determined not to be more than the second value successively for the first time period, display the second image, and when the first distance is determined to be more than the second value successively for the first time period, stop displaying the second image.

2. The information processing apparatus according to claim 1, the process further including:
stopping the displaying of the second image when a second distance for which the object moves in a direction parallel to the screen while the first distance is determined to be between the first value and the second value exceeds a third value.

3. The information processing apparatus according to claim 1, the process further including:
stopping the displaying of the second image when the position of an object is detected to be outside of the area.

4. An information processing method comprising:
detecting a position of an object with respect to a screen of a display,
determining whether a first distance from the object to the screen is between a first value and a second value smaller than the first value on a basis of the position of the object,
displaying a first image on the screen when the first distance is determined to be between the first value and the second value, the first image being an enlarged image of an area corresponding to the position of the object,
determining whether the first distance is equal to or less than the second value on a basis of the position of the object,
displaying a second image using a computer when the first distance is determined to be equal to or less than the second value, the second image being displayed on the screen when the first distance decreases to be the second value,
detecting that the first distance becomes more than the second value while displaying the second image,
determining whether the first distance is more than the second value successively for a first time period after detecting that the first distance becomes more than the second value, and
when the first distance is determined not to be more than the second value successively for the first time period, displaying the second image, and when the first distance is determined to be more than the second value successively for the first time period, stop displaying the second image.

5. The information processing method according to claim 4, further comprising:
stopping the displaying of the second image when a second distance for which the object moves in a direction parallel to the screen while the first distance is determined to be between the first value and the second value exceeds a third value.

6. The information processing method according to claim 4, further comprising:
stopping the displaying of the second image when the position of an object is detected to be outside of the area.

7. A non-transitory computer readable recording medium for storing an information processing program, the information processing program causing a computer to execute a process, the process comprising:
detecting a position of an object with respect to a screen of a display,
determining whether a first distance from the object to the screen is between a first value and a second value smaller than the first value on a basis of the position of the object,
displaying a first image on the screen when the first distance is determined to be between the first value and the second value, the first image being an enlarged image of an area corresponding to the position of the object,
determining whether the first distance is equal to or less than the second value on a basis of the position of the object,
displaying a second image when the first distance is determined to be equal to or less than the second value, the second image being displayed on the screen when the first distance decreases to be the second value,
detecting that the first distance becomes more than the second value while displaying the second image,
determining whether the first distance is more than the second value successively for a first time period after detecting that the first distance becomes more than the second value, and
when the first distance is determined not to be more than the second value successively for the first time period, displaying the second image, and when the first distance is determined to be more than the second value successively for the first time period, stop displaying the second image.

8. The non-transitory medium according to claim 7, the process further comprising:
stopping the displaying of the second image when a second distance for which the object moves in a direction parallel to the screen while the first distance is determined to be between the first value and the second value exceeds a third value.

9. The non-transitory medium according to claim 7, the process further comprising:
stopping the displaying of the second image when the position of an object is detected to be outside of the area.

* * * * *